United States Patent
Iwasaki

[11] Patent Number: 5,839,082
[45] Date of Patent: Nov. 17, 1998

[54] APPARATUS AND METHOD FOR CONTROLLING DAMPING FORCE CHARACTERISTIC OF VEHICULAR SHOCK ABSORBER

[75] Inventor: Katsuya Iwasaki, Atsugi, Japan

[73] Assignee: Unisia Jecs Corporation, Atsugi, Japan

[21] Appl. No.: 774,017

[22] Filed: Dec. 26, 1996

[30] Foreign Application Priority Data

Dec. 26, 1995 [JP] Japan .................................. 7-339137

[51] Int. Cl.$^6$ ................................................ B60G 17/015
[52] U.S. Cl. ............................................ 701/38; 280/707
[58] Field of Search .............................. 701/37, 38, 39, 701/71, 72; 280/707, 840

[56] References Cited

U.S. PATENT DOCUMENTS

| | | | |
|---|---|---|---|
| 4,924,393 | 5/1990 | Kurosawa | 701/38 |
| 4,953,890 | 9/1990 | Kamimura | 701/38 |
| 4,970,645 | 11/1990 | Adachi et al. | 701/38 |
| 5,015,006 | 5/1991 | Takehara et al. | 701/38 |
| 5,088,761 | 2/1992 | Takehara et al. | 701/38 |
| 5,089,966 | 2/1992 | Fukushima et al. | 280/707 |
| 5,127,667 | 7/1992 | Okuda et al. | 280/707 |
| 5,142,476 | 8/1992 | Shibata et al. | 701/38 |
| 5,374,113 | 12/1994 | Kaneada et al. | 303/116.2 |
| 5,515,277 | 5/1996 | Mine | 701/37 |
| 5,696,677 | 12/1997 | Leaphart et al. | 701/37 |

FOREIGN PATENT DOCUMENTS 4-500191  1/1992  Japan .

*Primary Examiner*—Gary Chin
*Attorney, Agent, or Firm*—Foley & Lander

[57] ABSTRACT

In apparatus and method for controlling a damping force characteristic of each vehicular shock absorber, when such a vehicular acceleration or deceleration as to determine an occurrence in an inclination of a vehicle body with respect to a road surface on which the vehicle runs occurs, bouncing components from among components constituting each of control signals to control the damping force characteristic of each shock absorber are nullified to prevent signal drifts from being generated due to the influence of the vehicle body inclination and due to the vehicular acceleration or deceleration.

14 Claims, 14 Drawing Sheets

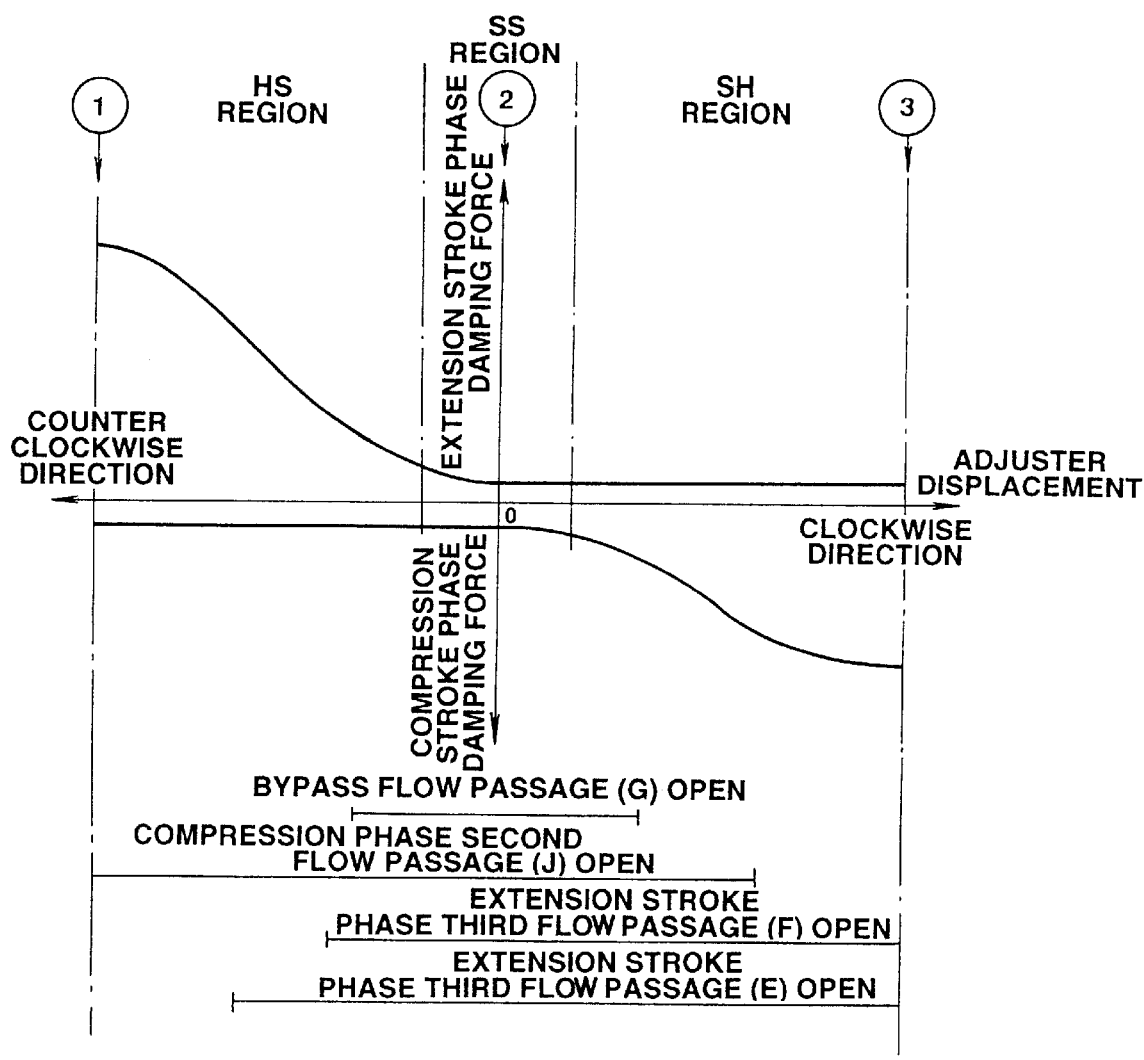

FIG.17
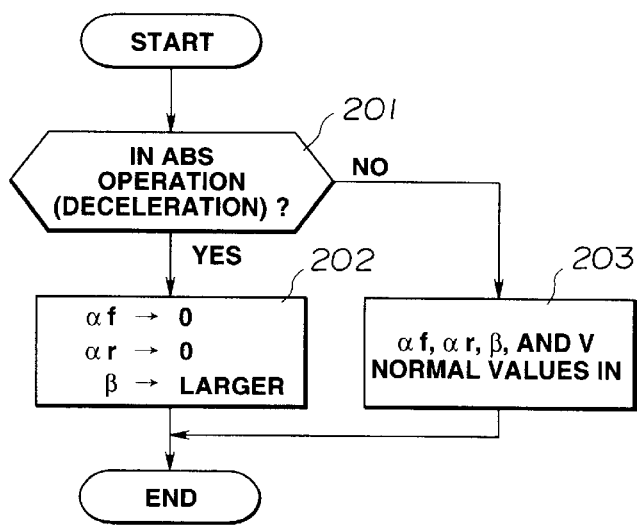

FIG.18D ABS CONTROL FLAG (DECELERATION DETERMINATION) 

APPARATUS AND METHOD FOR CONTROLLING DAMPING FORCE CHARACTERISTIC OF VEHICULAR SHOCK ABSORBER

BACKGROUND OF THE INVENTION

The present invention relates to apparatus and method for controlling damping force characteristics of vehicular shock absorbers, each of the shock absorbers being interposed between a sprung mass of a vehicle body and an unsprung mass of a corresponding one of front left and right road wheels and rear left and right road wheels.

A PCT Japanese Patent Application First Publication No. Heisei 4-500191 filed on Jan. 16, 1992 exemplifies a previously proposed vehicular suspension control apparatus in which a damping force characteristic control based on a Skyhook theorem is executed for each shock absorber. The Skyhook theorem is such that when the vehicle is on a vibration supression region where direction discriminating signs of a vehicular body (sprung mass) vertical velocity and of a relative velocity between the sprung mass and an unsprung mass (road wheel assembly) are coincident with each other, the damping force characteristic is adjusted to provide a hard characteristic so as to increase a vibration suppression force, thus suppressing a vehicular body vibration and when the vehicle is on a vibration application region where the discriminating signs of both velocities described above are not coincident with each other, the damping force characteristic is adjusted to provide a soft characteristic so as to decrease a damping force application force, thus suppressing a transmission of the unsprung mass input to the sprung mass. The above-described sprung mass vertical velocity is derived by calculating (integrating) a corresponding sprung mass vertical acceleration signal detected by means of a corresponding one of a plurality of vertical sprung mass acceleration sensors (accelerometers) installed on parts of the vehicle body.

However, the previously proposed vehicular suspension apparatus has the following inaccuracies.

That is to say, each sprung mass vertical acceleration sensor is attached onto a corresponding part of the vehicle body so that a detection direction of each acceleration sensor is vertical with respect to a road surface on which the vehicle is running. When the vehicle is running horizontally with respect to the road surface or with respect to a horizontal direction of the vehicle body, each sensor can detect accurately only in an acceleration component in the vertical direction. However, if the vehicle is accelerated or decelerated so that the vehicle is inclined toward either a forward or rearward direction with respect to the running road surface due to a vehicular posture change (squat or nose dive) in a pitching direction developed according to the vehicular acceleration or deceleration, the detection direction of each sensor with respect to the running road surface is inclined in the forward or rearward direction. In this state, when a forward or rearward acceleration or deceleration is acted upon the vehicle, a resultant force vector of the forward or rearward acceleration or deceleration acted upon the vehicle in parallel to the running road surface is also acted upon the detection direction of the each of the vertical acceleration sensors. The vertical acceleration signal is drifted by the resultant force vector so that a vehicular comfortability and a steering stability are consequently worsened.

SUMMARY OF THE INVENTION

It is an object of the present invention to provide apparatus and method for controlling damping force characteristics of vehicular shock absorbers in which prevent vehicular inclination with respect to a running road surface (or vehicular horizontal direction) developed when the vehicle is accelerated or decelerated, which prevent signal drifts in detected sprung mass acceleration signals due to a forward or rearward (longitudinal) acceleration or deceleration of the vehicle, and which prevent damping force characteristics of the respective shock absorbers from being worsened so as to assure vehicular comfortability and steering stability.

According to one aspect of the present invention, there is provided with an apparatus for a vehicle, comprising:

a) a plurality of shock absorbers, each shock absorber being interposed between a vehicle body as a sprung mass and a corresponding one of front left and right road wheels and rear left and right road wheels as an unsprung mass and being arranged so as to enable a variable modification of its damping force characteristic;

b) sprung mass vertical acceleration sensors, each arranged on the vehicle body adjacent to the corresponding one of the front left and right and rear left and right road wheels so as to detect a vertical acceleration of the sprung mass at the vehicle body corresponding one of the shock absorbers;

c) a control unit arranged for extracting vehicular bouncing components, a vehicular pitching component, and a vehicular rolling component from sprung mass acceleration signals derived by said sprung mass vertical acceleration sensors, for developing a control signal to be supplied to each shock absorber on the basis of at least the bouncing components, the pitching component, and the rolling component extracted from said sprung mass vertical acceleration signals, for variably adjusting said damping force characteristic of the corresponding one of the shock absorbers so as to provide a target damping force characteristic on the basis of a corresponding one of the developed control signals; and d) a vehicular running state detector arranged for detecting a variation rate of a vehicular running velocity, and wherein said control unit determines whether the vehicle body is inclined with respect to a running road surface on which the vehicle runs according to the variation rate of the vehicular running velocity and nullifies the bouncing components from among the components on the basis of which the control signals are developed when determining that the vehicle body is inclined.

According to another aspect of the present invention, there is provided with a method for controlling a damping force characteristic for each vehicular shock absorber, each vehicular shock absorber being interposed between a vehicle body as a sprung mass and a corresponding one of front left and right road wheels as an unsprung mass and being arranged so as to enable the damping force characteristic to be modified, comprising the steps of:

a) detecting a sprung mass vertical acceleration on a part of the vehicle body adjacent to the corresponding one of the front left and right road wheels;

b) determining vehicular bouncing components, a vehicular pitching component, a vehicular rolling component, and a vehicular rolling component according to the detected sprung mass vertical accelerations at the step a);

c) developing control signals for the respective shock absorbers, each of said control signals being developed on the basis of said bouncing component, the pitching component, and rolling component determined at the step b);

d) controlling the damping force characteristic for the corresponding one of the shock absorbers on the basis of the corresponding one of said developed control signals;

e) detecting whether the vehicle body is inclined with respect to a running road surface on which the vehicle is running;

f) nullifying the bouncing components from among the components constituting the respective control signals when detecting that the vehicle body is inclined with respect to the running road surface.

BRIEF DESCRIPTION OF THE DRAWINGS

FIG. 6 is a characteristic graph of an adjuster rotated in accordance with a stepwise rotation of a stepping motor associated with the adjuster in the representative one of the shock absorbers shown in FIGS. 1 to 5.

FIG. 17 is another operational flowchart executed in the embodiment of the damping force characteristic controlling apparatus shown in FIGS. 1, 2, and 13.

FIGS. 18A, 18B, 18C, and 18D are signal timing charts for explaining the operation in the damping force characteristic controlling apparatus shown in FIGS. 1, 2, and 13.

BEST MODE FOR CARRYING OUT THE INVENTION

Reference will hereinafter be made to the drawings in order to facilitate a better understanding of the present invention.

Figure 1:
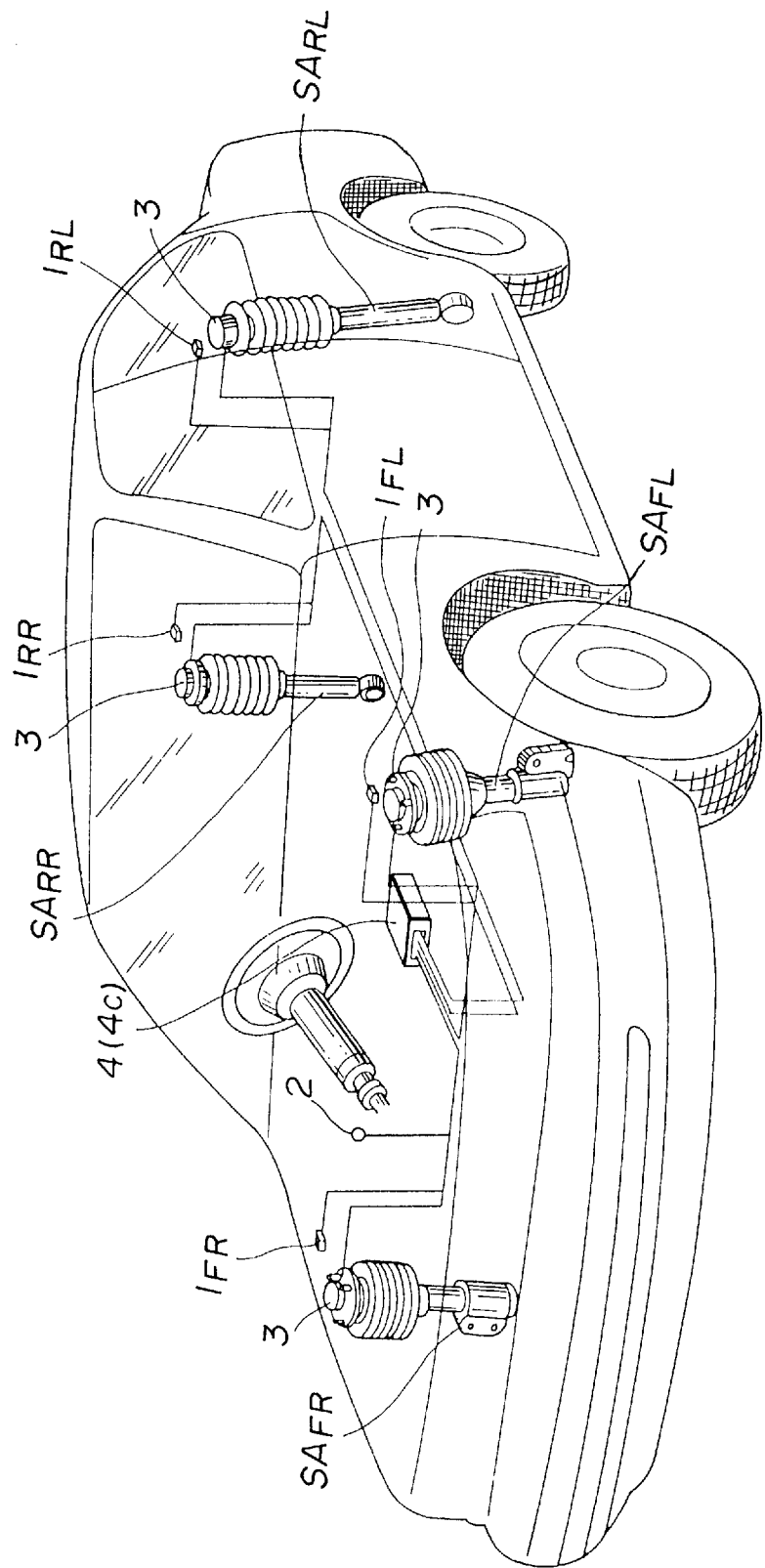
FIG. 1 is a generally perspective view of a vehicle to which a preferred embodiment of an apparatus for controlling damping force characteristics of vehicular shock absorbers according to the present invention is applicable.

FIG. 1 shows an automotive vehicle to which an apparatus for controlling damping force characteristics of respective shock absorbers in a preferred embodiment according to the present invention is applicable.

Figure 2:
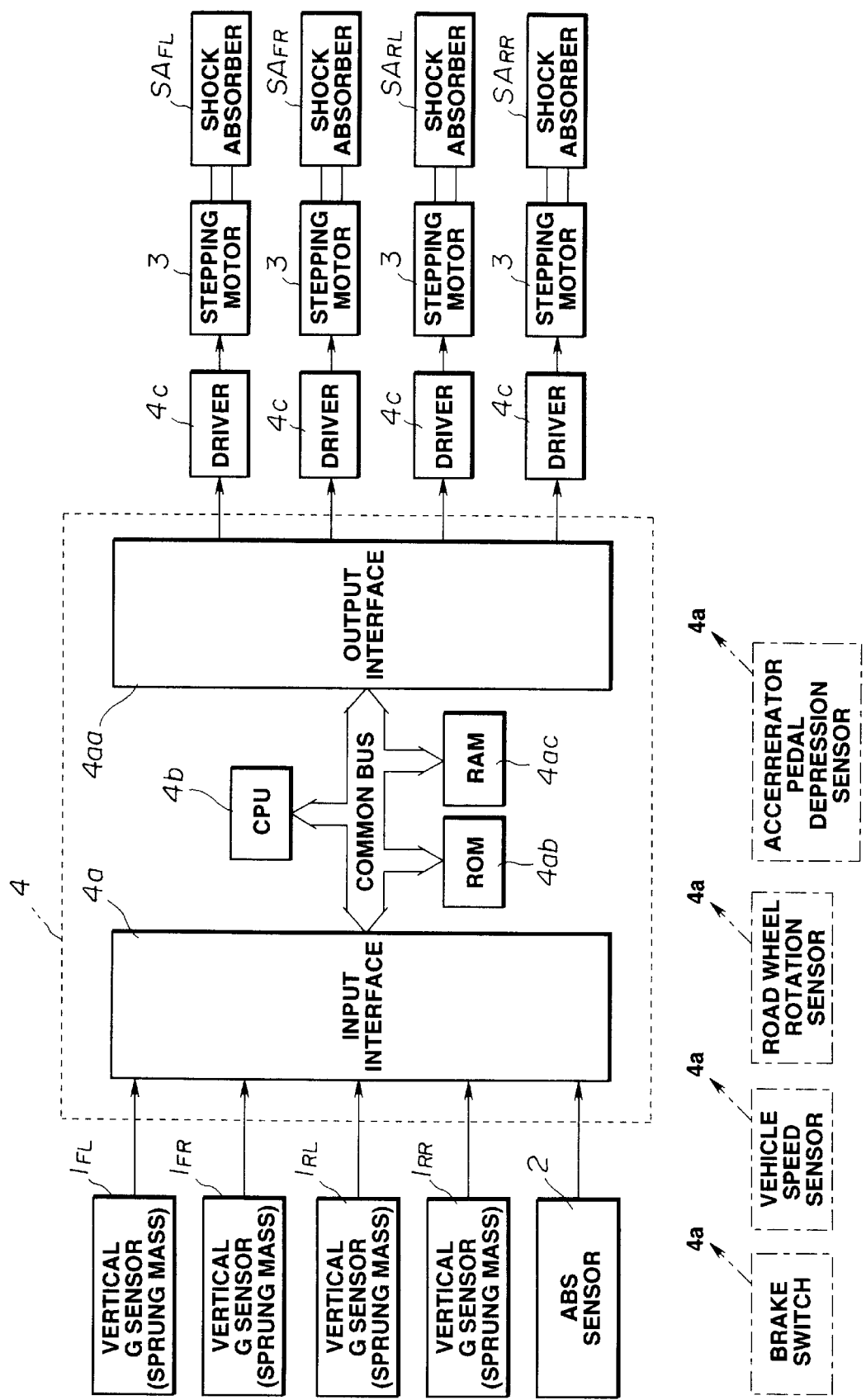
FIG. 2 is a circuit block diagram of the damping force characteristic controlling apparatus in the preferred embodiment shown in FIG. 1.

FIG. 2 shows a circuit block diagram of the damping force characteristic controlling apparatus in the preferred embodiment according to the present invention.

Four shock absorbers $SA_{FL}$, $SA_{FR}$, $SA_{RL}$, and $SA_{RR}$ are interposed between a vehicle body as a sprung mass and a corresponding one of front left and right road wheels and rear left and right road wheels as an unsprung mass.

It is noted that the representative one of the four shock absorbers is denoted merely by SA.

It is also noted that a subscript of FR denotes a front right road wheel, a subscript of FL denotes a front left road wheel, a subscript of RR denotes a rear right road wheel, and a subscript of RL denotes a rear left road wheel.

A plurality of sprung mass vertical acceleration sensors $1_{FL}$, $1_{FR}$, $1_{RL}$, and $1_{RR}$ are disposed on parts of the vehicle body adjacent to the respectively corresponding front left and right and rear left and right road wheels (vertical G sensors) to detect the sprung mass vertical accelerations at the parts of the vehicle body (positive (+) when it is upward and negative (−) when it is downward). In addition, an ABS sensor 2 which detects an operation of an ABS system (Anti-Brake (anti-skid) control System) is connected to a control unit 4. The anti-skid (braking) control system is exemplified by a U.S. Pat. No. 5,374,113 issued on Dec. 20, 1994 (the disclosure of which is herein incorporated by reference).

The control unit 4 is installed at a part of the vehicle body adjacent to a vehicular passenger seat for receiving signals derived from each of the vertical G sensors 1 ($1_{FL}$, $1_{FR}$, $1_{RL}$, and $1_{RR}$) and ABS sensor 2 and for outputting drive signals to respective stepping motors 3 associated with respectively corresponding shock absorbers SA ($SA_{FL}$, $SA_{FR}$, $SA_{RL}$, and $SA_{RR}$).

The control unit 4 includes an input interface 4a, a CPU (Central Processing Unit) 4b, a common bus, ROM (Read Only Memory) 4ab, RAM (Random Access Memory) 4ac, and an output interface 4aa. A plurality of drivers 4c are interposed between the output interface 4aa and the respectively corresponding stepping motors 3 for receiving the control signals from the output interface 4aa and deriving drive signals to rotate the corresponding stepping motors 3 according to the contents of the control signals. It is noted that the drivers 4c are incorporated into the control unit 4 and the stepping motors 3 are installed on the respectively corresponding shock absorbers SA as described later.

Figure 3:
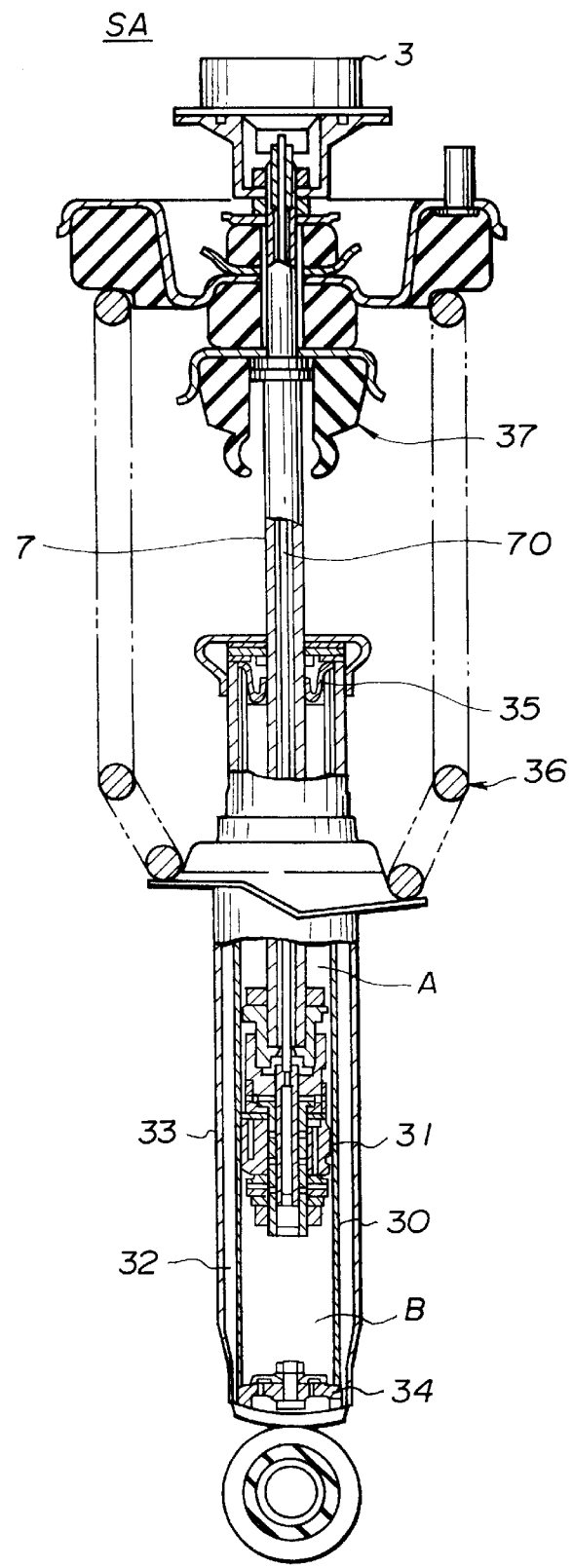
FIG. 3 is partially vertical and horizontal cross sectional views of each of the shock absorbers shown in FIGS. 1 and 2.

FIG. 3 shows the cross sectional views of the representative one of the shock absorbers SA.

In FIG. 3, each shock absorber used in the embodiment described above includes: a cylinder 30, a piston 31 defining an upper (portion) chamber A and a lower (portion) chamber B, an outer envelope 33 forming a reservoir chamber 32 on an outer periphery of the cylinder 30, a base 34 defining the lower chamber B and reservoir 32, a guide to member 35 guiding a slide motion of the piston rod 7 linked to the piston 31, a suspension spring 36 interposed between the outer envelope 33 and the vehicle body, and a bumper rubber 37.

Figure 4:
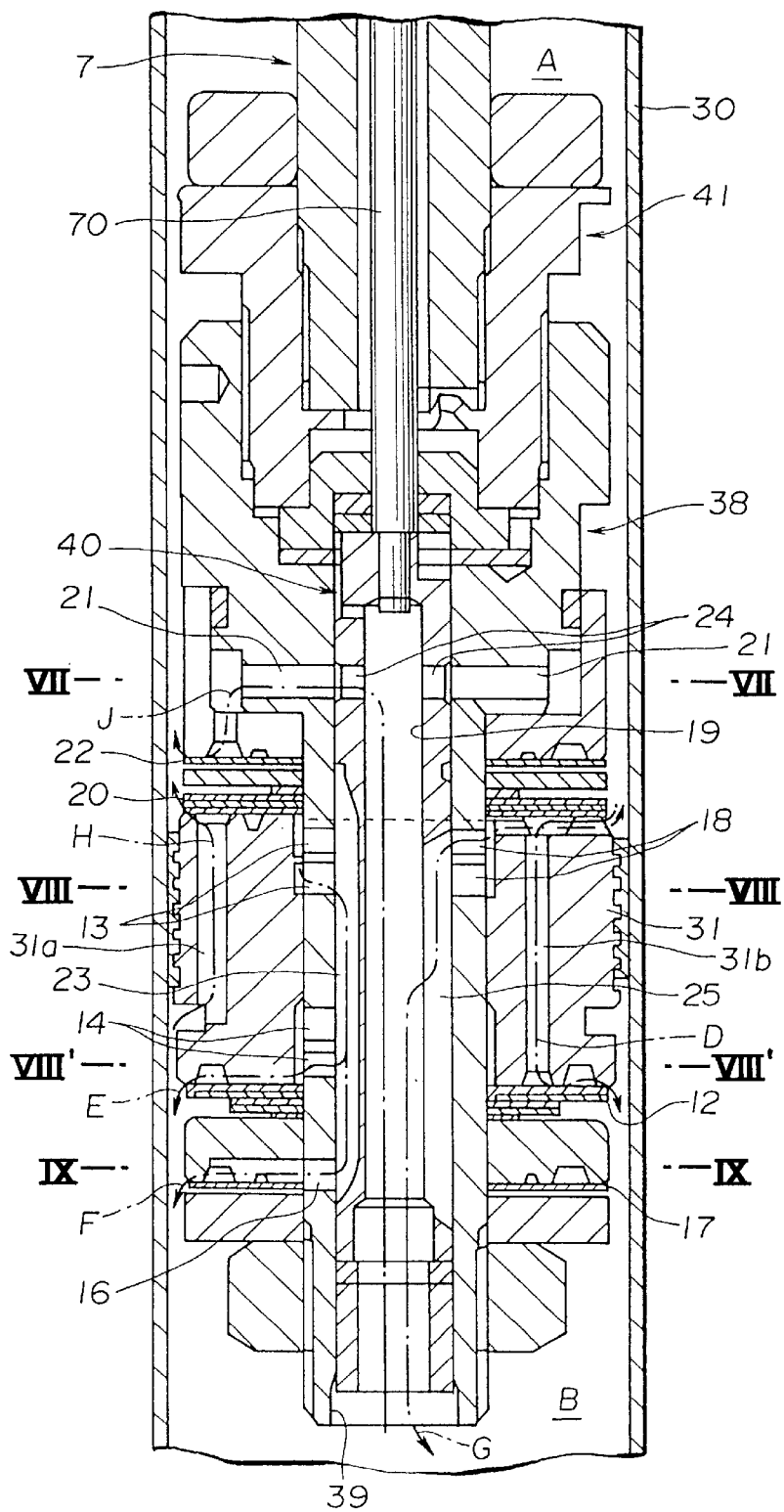
FIG. 4 is a partially cross sectional view of a main part of the representative one of the shock absorbers shown in FIG. 3.

FIG. 4 shows an enlarged cross sectional view representing a part of the piston assembly 31 and its surrounding part of each of the shock absorbers SA.

As shown in FIG. 4, the piston 31 is formed with penetrating holes 31a and 31b therethrough. In addition, the piston 31 is provided with a compression phase attenuation valve 20 and an extension phase attenuation valve 12, both of the valves 20, 12 respectively opening and closing the respective penetrating holes 31a and 31b. A stud 38 is spirally meshed with and fixed to a bound stopper 41 spirally meshed with and fixed to a tip end of the piston rod 7.

The stud 38 is penetrated through the piston 31. In addition, the stud 38 is formed with a communication hole 39 so as to communicate with the upper portion chamber A and the lower portion chamber B. In the communication hole 39 forming flow passage (an extension phase second flow passage E, extension phase third flow passage F, bypass flow passage G, and compression phase second passage as will be described later). Then, the adjuster 40 which changes flow passage cross sectional areas of the above-described flow passage is provided within the communication hole 39.

Furthermore, an extension phase side check valve 17 and a compression phase side check valve 22 are also installed on an outer periphery of the stud 38, which enable and disable the fluid flow through the above-described flow passages formed by the communication hole 39 in accordance with a direction of the flow of the fluid. As shown in FIG. 3, the adjuster 40 is rotatable by means of the corresponding one of the actuators (stepping motors) 3 via the control rod 70.

It is noted that the stud 38 is formed with a first part 21, a second port 13, a third port 18, a fourth port 14, and fifth port 16, respectively, in an upper order (sequence).

On the other hand, referring to FIG. 4, the adjuster 40 is formed with a hollow portion 19, a first lateral hole 24, and a second lateral hole 25, both lateral holes communicating the internal and external portions of the adjuster 40. A longitudinal groove 23 is formed on an outer peripheral portion. Hence, four flow passages are formed between the upper portion chamber A and the lower portion chamber B as the fluid flow passages when the piston stroke indicates the extension phase: namely, 1) an extension phase first flow passage D such that the fluid passes the penetrating hole 31b, a valve opened internal side of the extension phase side attenuation valve 12, and reaches the lower portion chamber B; 2) an extension phase second flow passage E in which the fluid flows through the second port 13, the longitudinal groove 23, the fourth port 14, a valve opened outer peripheral side of the extension phase side attenuation valve 12, and reaches the lower portion chamber B; 3) an extension phase side third flow passage F in which the fluid passes through the third port 18, the second internal hole 25, and the hollow portion 19 and reaches the lower portion chamber B.

In addition, the three fluid flow passages through which the fluid can be caused to flow during the compression phase side of the piston 31 includes: 1) a compression phase (stroke side) first flow passage H in which the fluid flows through the penetrating hole 31a and valve opened e compression stroke side (phase) second flow passage J in which the hollow portion 19, the first lateral hole 24, the first port 21, and the opened compression phase (stroke side) check valve 22 and reaches the upper portion chamber A; and 3) the bypass passage G in which the fluid flows through the hollow portion 19, the second lateral hole 25, and the third port 18.

Figure 5:
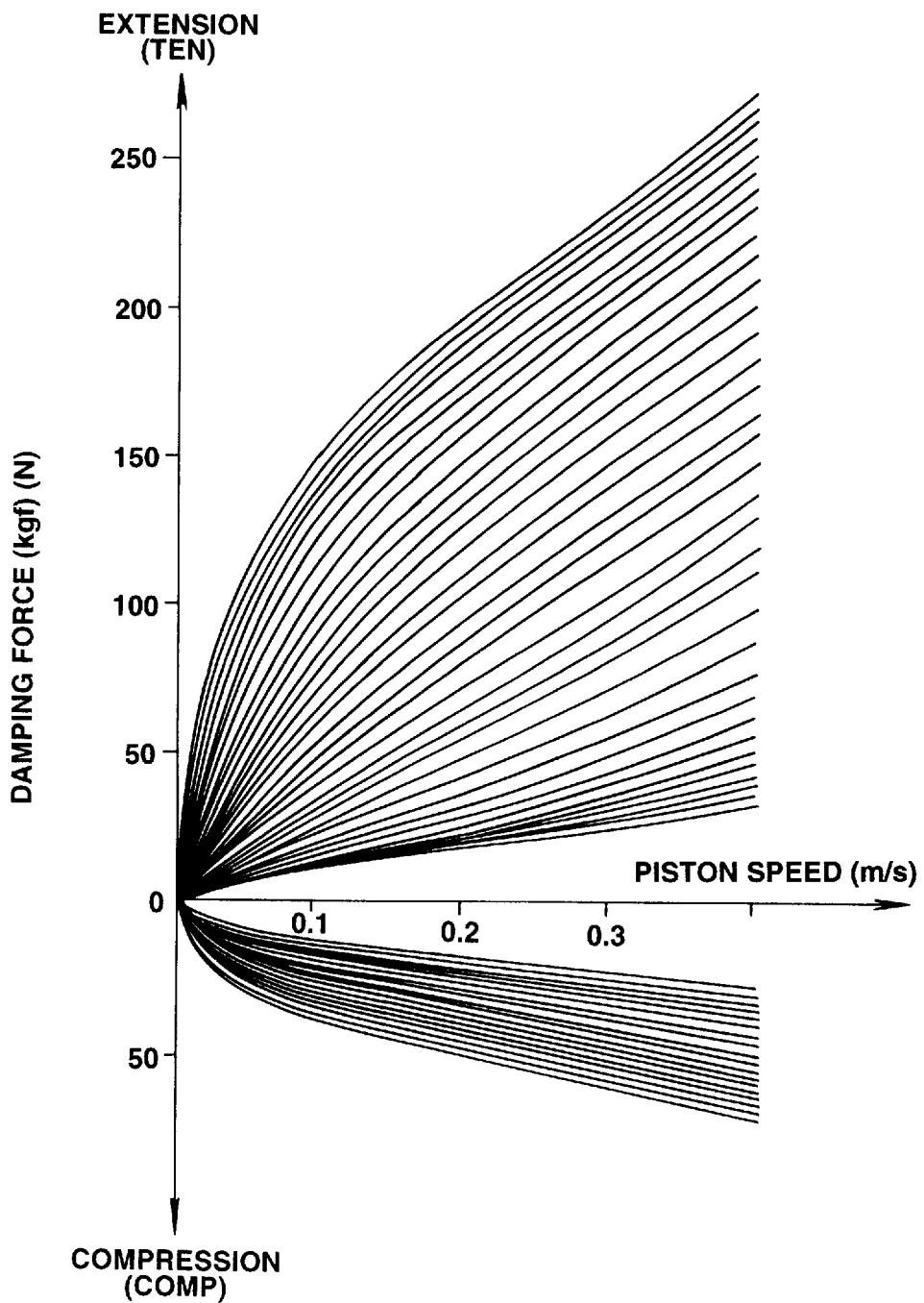
FIG. 5 is a damping force characteristic graph representing a damping force with respect a piston speed in the representative one of the shock absorbers shown in FIGS. 1 to 4.

In summary, the shock absorber SA is so arranged and constructed as to be enabled to change the damping force characteristics at a multiple stage in its damping force characteristic, as shown in FIG. 5, either in the extension phase or compression phase when the adjuster 40 is pivoted according to the rotation of the corresponding one of the stepping motors 3.

FIG. 6 shows relationships between the rotated position of the adjuster 40 and damping force characteristics at both of the extension phase and compression phase with respect to the piston 31.

In details, as shown in FIG. 6, when the adjuster 40 is pivoted in a given counterclockwise direction from a generally center position at which both of the extension and compression phases are in soft damping force characteristic positions (hereinafter, referred to as a soft region (soft control mode) SS), the damping force coefficient at the extension phase can be changed at the multiple stage from a maximum hard to a minimum hard characteristic but the compression stroke side is fixed at a soft position (hereinafter, referred to as an extension stroke side (phase) hard region HS). On the contrary, when the adjuster 40 is pivoted in a given clockwise direction therefrom, the damping force characteristic at the multiple stages and the damping force characteristic in the compression stroke side is fixed to the soft position (hereinafter, referred to as a compression hard region (compression phase hard) SH).

Figure 7A:
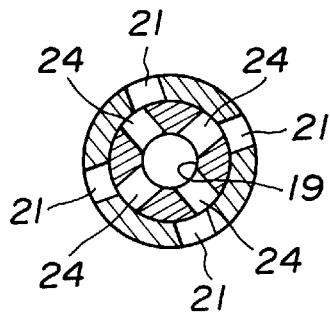
FIGS. 7A, 7B, and 7C are cross sectional views cut away along lines of VIII—VIII in FIG. 4.
Figure 7B:
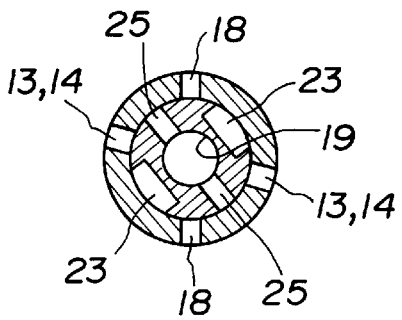
Figure 7C:
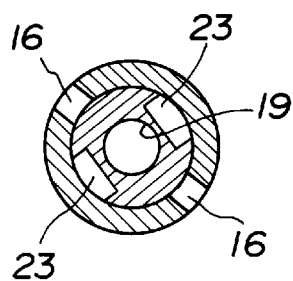
Figure 8A:
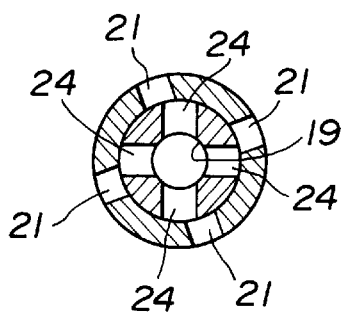
FIGS. 8A, 8B, and 8C are cross sectional views cut away along lines of VIII—VIII and VIII'—VIII' in FIG. 4.
Figure 8B:
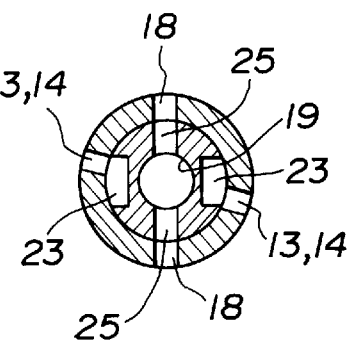
Figure 8C:
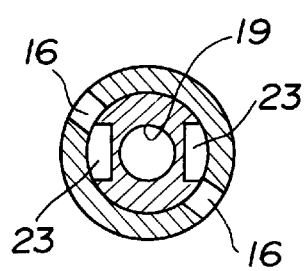
Figure 9A:
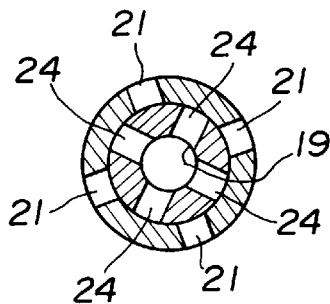
FIGS. 9A, 9B, and 9C are cross sectional views cut way along a line of IV—IX in FIG. 4.
Figure 9B:
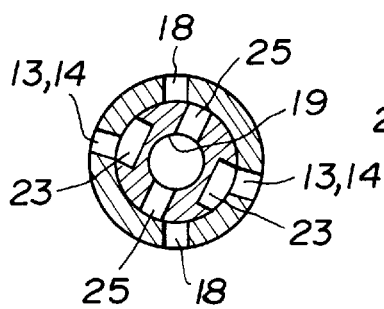
Figure 9C:
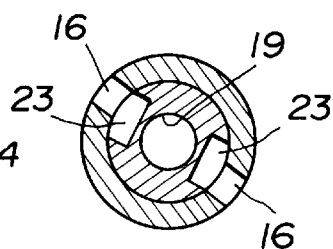

When, as shown in FIG. 6, the adjuster 40 is pivoted at any one of positions ①, ②, and ③, cross sections of the piston assembly portions cut away along lines K—K, L—L, M—M, and N—N of FIG. 4 are respectively shown in FIGS. 7A (①), 7B (②), and 7C (③) (K—K), 8A (①), 8B (②), and 8C (③) (L—L, M—M), 9A (①), 9B (②), and 9C (③) (N—N), respectively.

Figure 10:
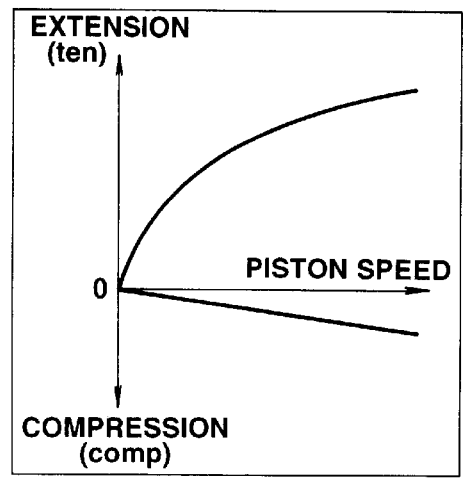
FIG. 10 is a characteristic graph of the damping force characteristic of the representative one of the shock absorbers when the shock absorber is on an HS region in which an extension phase is hard.
Figure 11:
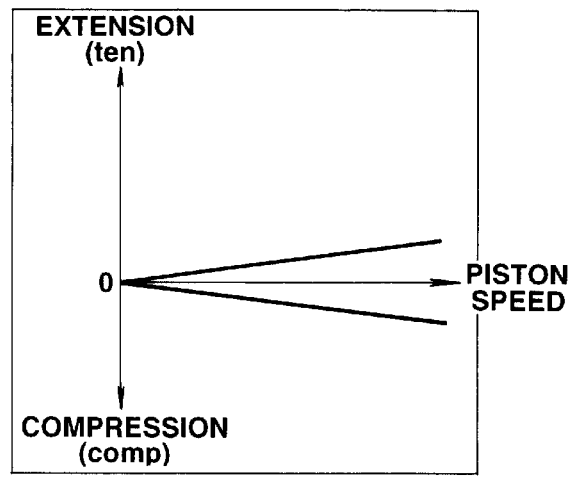
FIG. 11 is a characteristic graph of the damping force characteristic of the representative one of the shock absorbers when the shock absorber is on an SS region in which both of compression and extension phases are soft.
Figure 12:
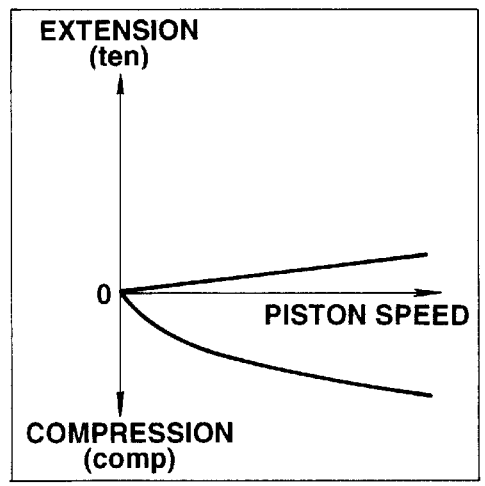
FIG. 12 is a characteristic graph of the damping force characteristic of the representative one of the shock absorbers when the shock absorber is on an SH region in which the compression phase is hard.

The damping force characteristics at the respective portions ①, ②, and ③ shown in FIG. 6 are shown in FIGS. 10, 11, and 12, respectively.

FIG. 10 shows the damping force characteristic of the representative shock absorber SA when the adjuster 40 is positioned at ① of FIG. 6.

FIG. 11 shows that when the adjuster 40 is positioned at ② of FIG. 6.

FIG. 12 shows that when the adjuster 40 is positioned at ③ of FIG. 6.

Figure 13:
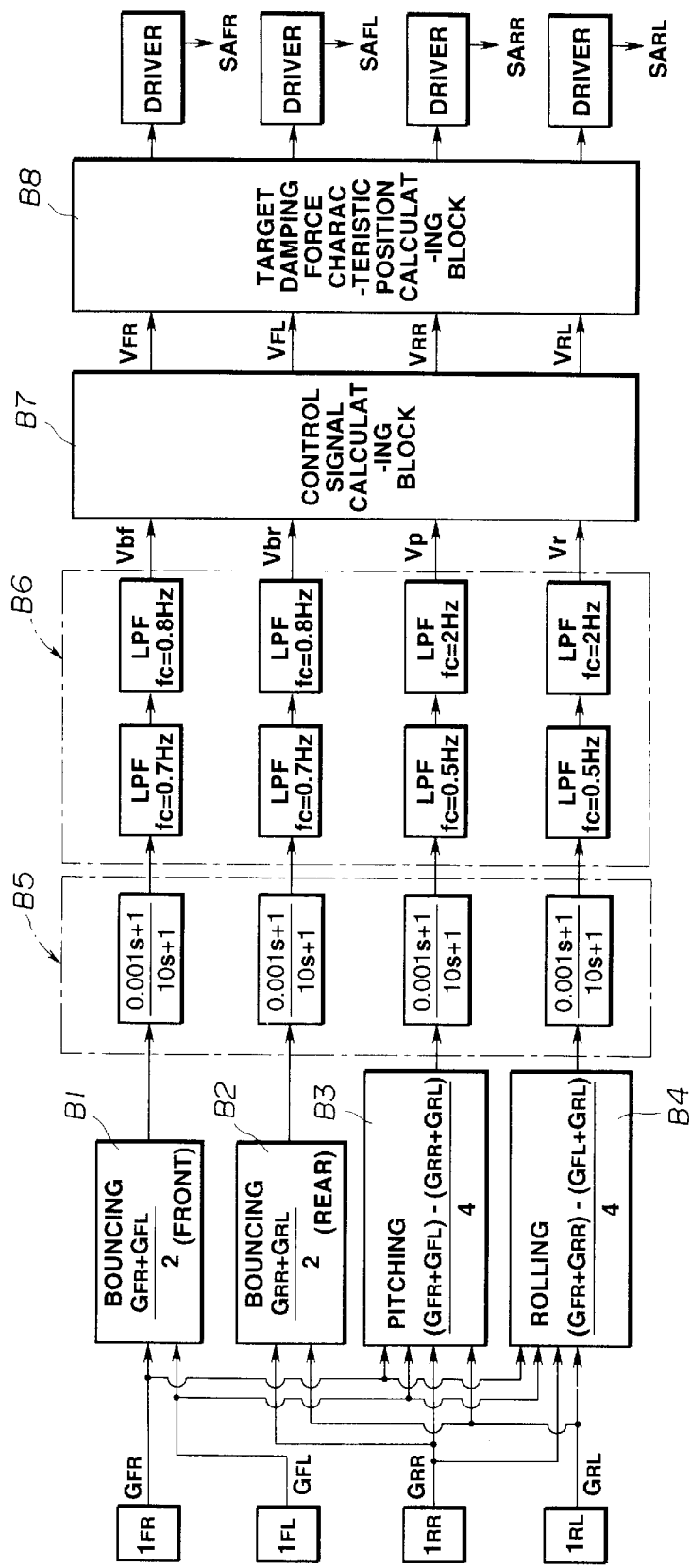
FIG. 13 is a signal processing circuit diagram of the damping force characteristic controlling apparatus in the embodiment shown in FIGS. 1 to 4.

Next, FIG. 13 shows the content of the control over the damping force characteristics of the respective shock absorbers SA ($SA_{FL}$, $SA_{FR}$, $SA_{RL}$, and $SA_{RR}$) in the preferred embodiment of the damping force characteristic controlling apparatus according to the present invention.

At a first block B1, the CPU 4b calculates a bouncing component $G_{B-F}$ at a center portion between the front road wheel sided portions of the vehicle body as a function of the following equation (1):

$$G_{B-F}=(G_{FL}+G_{FR})/2 \qquad (1).$$

At a second block B2, the CPU 4b calculates a bouncing component $G_{B-R}$ at a center portion between the rear road wheel sided portions of the vehicle body as a function of the following equation (2):

$$G_{B-R}=(G_{RL}+G_{RR})/2 \qquad (2).$$

In the equations (1) and (2), $G_{FR}$ denotes the sprung mass vertical acceleration signal value derived from the vertical G sensor $1_{FR}$ located on the vehicle body adjacent to the front right road wheel, $G_{FL}$ denotes the sprung mass vertical acceleration signal value derived from the vertical G sensor $1_{FL}$ located on the vehicle body adjacent to the front left road wheel, $G_{RL}$ denotes the sprung mass vertical acceleration signal value derived from the vertical G sensor $1_{RL}$, and $G_{RR}$ denotes the sprung mass vertical acceleration signal value derived from the vertical G sensor $1_{RR}$.

At a third block B3, the CPU 4b calculates a vehicular rolling component $G_R$ as a function of the following equation (3):

$$G_R=((G_{FR}+G_{RR})-(G_{FL}+G_{RL}))/4 \qquad (3).$$

At a fourth block B4, the CPU 4b calculates a vehicular pitching component $G_P$ as a function of the following equation (4):

$$G_R=((G_{FR}+G_{RR})-(G_{RL}+G_{RR}))/4 \qquad (4).$$

At a fifth block B5, the CPU 4b converts the bouncing component $G_{B-F}$ at the front center position into a bouncing component $V_{B-F}$ thereat, converts the bouncing component $G_{B-R}$ at the rear center position into a bouncing component $V_{B-R}$, converts the pitching component $G_P$ into a pitching component $V_P$, and converts the rolling component $G_R$ into a rolling component $V_R$, respectively. It is noted that these series of velocity conversions are executed using the following equation:

$$G_{(S)}=(A_S+1)/(B_S+1) \qquad (5). (A<B)$$

In addition, as a phase lag compensation formula having the same phase and gain characteristics as those in a case where the integration of (1/s) in a frequency region of 0.5 Hz to 3 Hz required for the damping force characteristic control and to reduce the gain at the low frequency side (~0.05 Hz), the following transfer equation (6) is used:

$$G_{(S)}=(0.001s+1)/(10s+1)\times\gamma \qquad (6).$$

In the equations (5) and (6), γ denotes the gain used to match the gain characteristic to that of the signal derived from the integration (1/s) and s denotes a complex variable and the equations (5) and (6) denote the Laplace transformation equations.

Figure 14A:
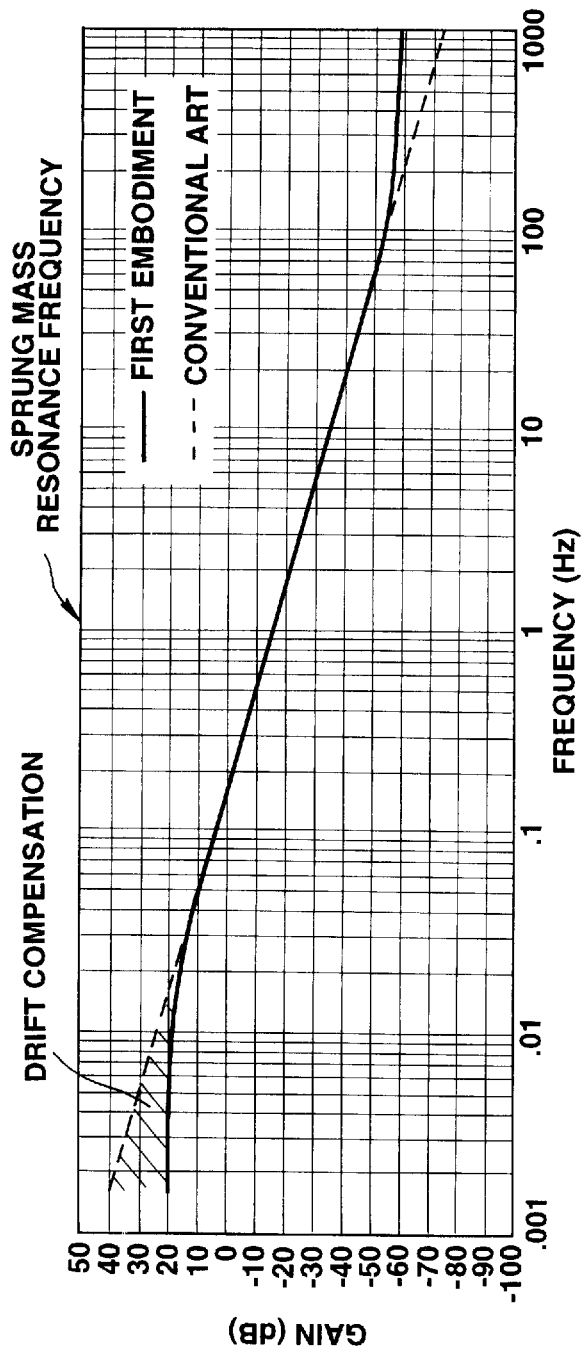
FIGS. 14A and 14B are characteristic graphs of a gain and phase of a phase lag compensation equation executed in a control unit shown in FIGS. 1, 2, and 13.
Figure 14B:
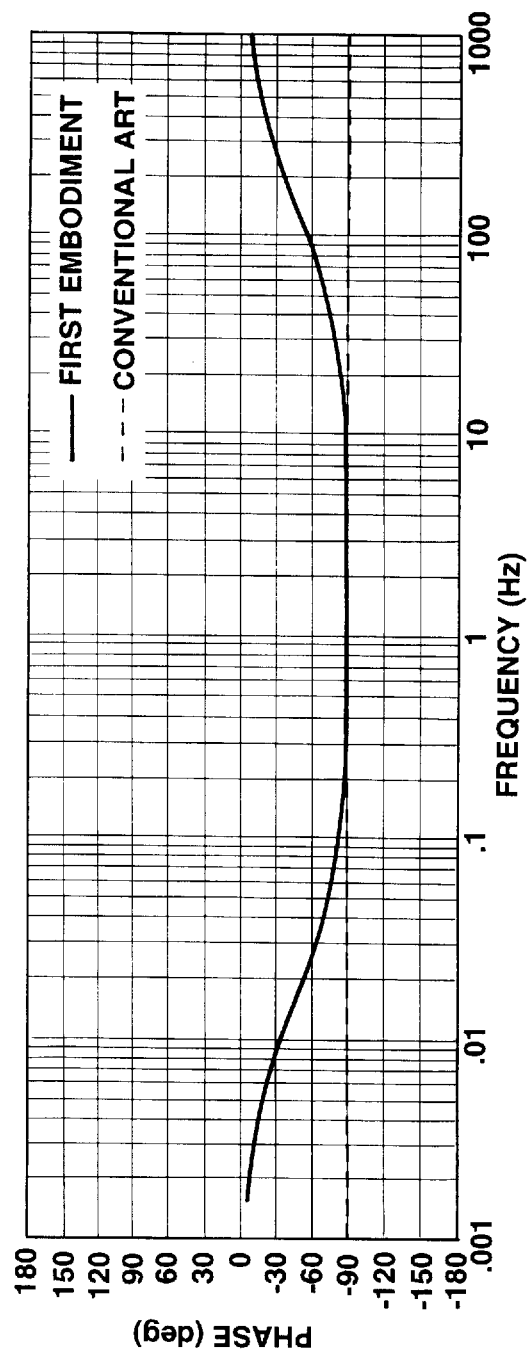

In the preferred embodiment, γ=10 is set. Consequently, as the gain characteristic denoted by a solid line in FIG. 14A is shown and as the phase characteristic denoted by the solid line of FIG. 14B is shown, the gain at the low frequency side is only reduced without worsening of the gain characteristic at the frequency band (0.5 Hz to 3 Hz) required for the damping force characteristic control. It is noted that dotted lines of FIGS. 14A and 14B are the gain and phase characteristics when the integration for the vertical sprung mass acceleration is executed with respect to (1/s).

At the next sixth block B6, the CPU 4b executes the band pass filtering processing BPF in order to enhance an isolation characteristic for the signals except a target frequency band to be executed for control.

That is to say, for the respective bouncing components $V_{B-F}$ and $V_{B-R}$, a second-order (butterworth) high-pass filter HPF (0.7 Hz) and a second-order (butterworth) low-pass filter LPF (0.8 Hz) are used so that the bouncing component $V_{bf}$ at the front center position and the bouncing component $V_{bf}$ at the rear center position are derived. In addition, for the pitching and rolling components $V_p$ and Vr, the second-order high pass filter HPF (0.5 Hz) and the second-order low pass filter LPF (0.5 Hz) are used to derive the processed pitching and rolling components $V_p$ and $V_r$.

It is noted that each component signal is given as a positive value for the upward direction and given as a negative value for the downward direction.

At the subsequent block B7 (control signal calculating block), the bounce gains α f and α r mutually independent of the front road wheel side and the rear road wheel side and the pitch gain β and roll gain γ are set. The arithmetic operation processing to derive the control signals V ($V_{FR}$, $V_{FL}$, $V_{RL}$, and $V_{RR}$) for the respectively road wheel arranged positions of the vehicle body on the basis of the following equations (7), (8), (9), and (10).

Front right road wheel:

$$V_{FR}=\alpha_f V_{bf}+\beta \cdot V_P + r \cdot V_R \qquad (7).$$

Front left road wheel:

$$V_{FL}=\alpha_f V_{bf}+\beta \cdot V_P - r \cdot V_R \qquad (8).$$

Rear right road wheel:

$$V_{RR}=\alpha_r \cdot V_{br}-\beta \cdot V_P + r \cdot V_R \qquad (9).$$

Rear left road wheel:

$$V_{RL}=\alpha_r \cdot V_{br}-\beta \cdot V_P - r \cdot V_R \qquad (10).$$

Figure 15:
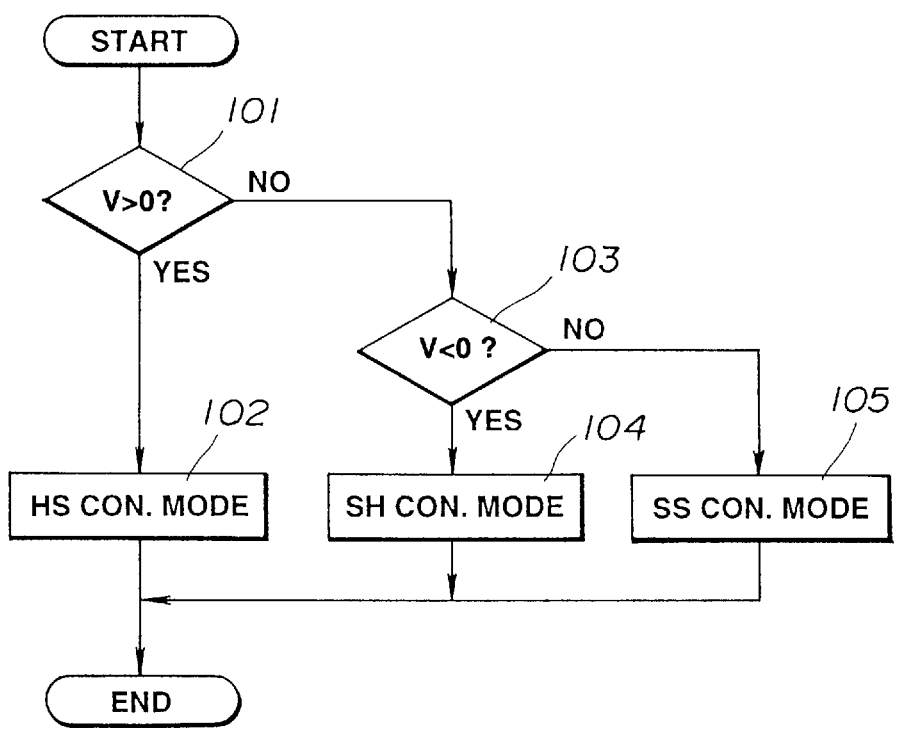
FIG. 15 is an operational flowchart executed in the damping force characteristic controlling apparatus in the embodiment shown in FIGS. 1, 2, and 13.
Figure 16A:
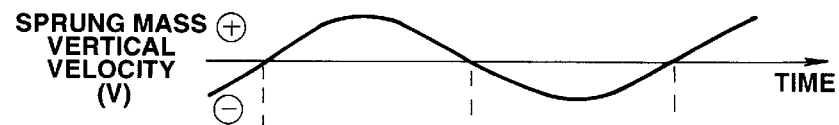
FIGS. 16A, 16B, 16C, 16D, and 16E are timing charts of each signal at a part of the damping force characteristic controlling apparatus shown in FIGS. 1, 2, and 13.
Figure 16B:
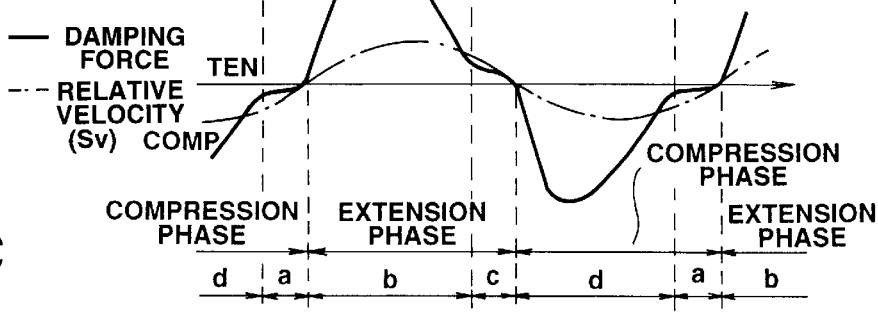
Figure 16C:
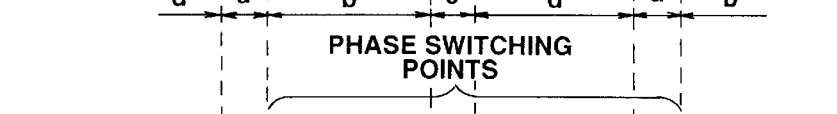
Figure 16D:
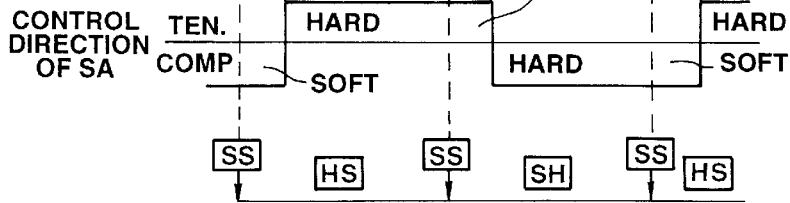
Figure 16E:
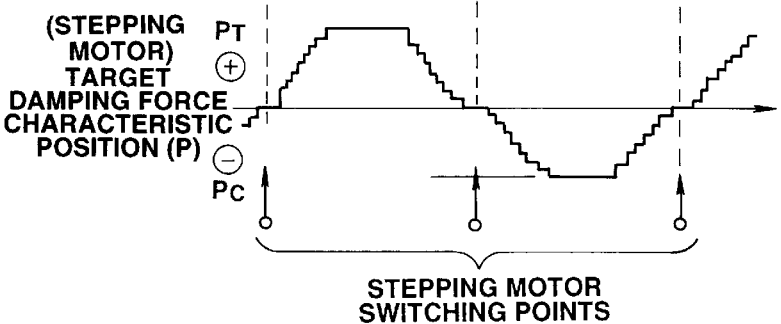

At the subsequent block B8 (target damping force characteristic position calculating block), a target damping force characteristic position P ($P_T$, $P_C$) for each shock absorber SA is calculated by the CPU 4b on the basis of an operational flowchart shown in FIG. 15.

At a step 101 of the flowchart in FIG. 15, the CPU 4b determines whether the control signal V indicates positive.

The routine goes to a step 102 in which the CPU 4b is operated to control each shock absorber SA to the extension stroke side hard region HS if the CPU determines that V>0. If the CPU 4b determines that V<0 at the step 103, the routine goes to a step 103 in which the CPU 4b determines whether V<0.

If Yes at the step 103, the routine goes to a step 104 in which the CPU 4b controls each shock absorber SA to the compression phase hard region SH.

If No at the step 103 (V=0), the routine goes to a step 105 in which the CPU 4b controls each shock absorber SA to both of the compression and extension phases in SS mode (soft and soft).

That is to say, if the control signal V is varied as shown in timing charts shown in FIGS. 16A, 16B, 16C, 16D, and 16E, the shock absorbers SA are controlled in the soft region SS when the control signal value V is zeroed.

In addition, when the control signal V indicates positive, the extension phase hard region HS is controlled so that the damping force characteristic at the compression phase is fixed to the soft characteristic and the damping force characteristic at the extension phase constituting the control signal (target damping force characteristic position $P_T$) is varied in proportion to the control signal V based on the following equation (11).

$$P_T = \delta_T \cdot V \tag{11}$$

In the equation (11), $\delta_T$ denotes a constant at the extension phase side.

In addition, if the value of the control signal V indicates negative, the control is returned to the compression phase hard region SH to modify the compression phase damping force characteristic (target damping force characteristic Pc) in proportion to the control signal V on the basis of the following equation (12).

$$P_c = \delta_c \cdot V \tag{12}$$

In the equation (12), $\delta_c$ denotes a constant at the compression phase.

Referring back to FIG. 13, at a ninth block B9 (driver for each stepping motor 3), the CPU 4b outputs the driver signal to each stepping motor 3 toward the target damping force characteristic P calculated at the eight block B8.

At timing charts of FIG. 16A through 16E, the region a denotes a state wherein the control signal V based on the sprung mass vertical velocity is reversed from a negative value (upward) to a positive value (downward). At this time, since the relative velocity between the sprung mass and the unsprung mass indicates the negative region (the compression phase side toward which the shock absorber SA strokes) on the basis of the direction of the control signal V, the compression stroke side which is the stroke of the shock absorber SA indicates the soft characteristic.

In addition, the region b indicates the region switched from the negative value to the positive value (extension stroke side toward which the shock absorber SA strokes) on the relative velocity between the sprung mass and the unsprung mass with the control signal V being left to indicate the positive value(upward). At this time, the shock absorber SA is controlled at the extension phase hard region SH on the basis of the direction of the control signal V. In addition, since the stroking phase of the shock absorber SA is also in the extension phase, hence, the extension stroking phase of the shock absorber SA indicates the hard characteristic in proportion to the value of the control signal V.

In addition, the region c is a state wherein the control signal V is reversed from the positive value (upward) to the negative value (downward). At this time, since the relative velocity between the sprung mass and unsprung mass indicates positive (extension phase side of the stroke of the shock absorber SA), the shock absorber SA is controlled to the compression phase hard region SH on the basis of the direction of the control signal V. Hence, at the region thereof, the compression phase side of the shock absorber SA indicates the hard characteristic in proportion to the value of the control signal V.

As described above, in the embodiment according to the present invention, when the sign of the control signal V and the sign of the relative velocity between the sprung mass and the unsprung mass are the same signs (region b and the region d), the stroking side of the shock absorber SA is controlled to the hard characteristic. When the signs described above are different (the region a and the region c) from each other, the instantaneous shock absorber SA falls in the soft characteristic. The same control as the damping force characteristic based on the Skyhook (control) theorem is carried out only by means of the control signal V.

In addition, when the stroking position of the shock absorber SA is switched, namely, the control is transferred from the region a to the region b, namely, from the region c to the region d (from the soft characteristic to the hard characteristic), the damping force characteristic position at the switching stroke side is already carried out at the regions a and c so that the switching from the soft characteristic to the hard characteristic is carried out without delay in time. Consequently, the high control responsive characteristic is achieved and the switching between the hard characteristic to the soft characteristic is carried out without the drive of the corresponding one of the stepping motors 3. Thus, the durability of each stepping motor 3 and the saving of the consumed power can be improved.

Figure 18A:
Figure 18B:
Figure 18C:
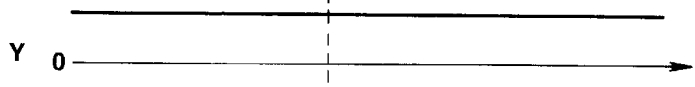

Next, FIGS. 17 and 18 (A) to 18 (D) show timing charts for explaining the content of a switching control operation to the corrective control when the vehicle is decelerated.

At a step 201, the CPU 46 determines whether the ABS is operating or not according to the signal derived from the ABS sensor 2.

If No (namely, the anti-skid braking controlling apparatus is not operated) at the step 201, the routine goes to a step 203 in which the front road wheel side bouncing gain α f, the pitching gain β, and the rolling gain γ are maintained at the normally set value.

On the other hand, if YES (in operation of the anti-skid braking controlling apparatus) at the step 201, the CPU 4b determines that the vehicle is decelerated so that the routine goes to a step 202 in which the front road wheel side bouncing gain $\alpha_f$ and the rear road wheel side bouncing gain $\alpha_r$ are corrected and set to zeroes, respectively.

Furthermore, the content of the corrective control during the vehicular deceleration will be described with reference to FIG. 19.

(1) Cruise Speed

While the vehicle cruises, namely, the vehicle runs on a road surface at a constant speed, the signal derived from the ABS sensor 2 is in the ABS non-operation state, the CPU 4b is operated to keep the front road wheel sided bouncing gain $\alpha_f$, the rear road wheel sided bouncing gain $\alpha_r$, and the pitching gain β, and the rolling gain γ at the normal values so that the damping force characteristics of the respective shock absorbers SA are controlled to provide optimum damping force characteristic gains.

Figure 19:
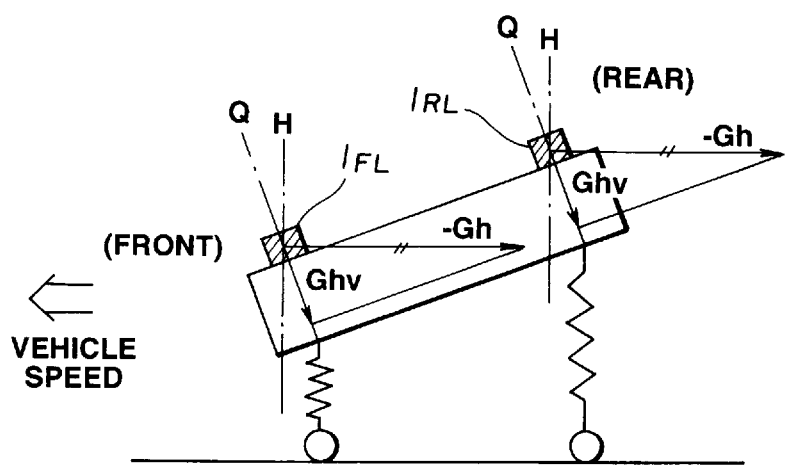
FIG. 19 is an explanatory side view of the vehicle during a vehicular deceleration for explaining a content of a corrective control executed in the embodiment of the damping force characteristic controlling apparatus.

(2) Deceleration:

While the vehicle is decelerated such as an abrupt braking application during the vehicular running, a nose diving such that the front end of the vehicle is dived and the rear end of the vehicle is float as shown in FIG. 19 occurs and the whole vehicle is inclined with respect to the running road surface so that the detection direction axle Q of each vertical G sensor 1 is accordingly inclined from a vertical direction axis H with respect to the running road surface.

When the forward/rearward acceleration -$G_b$ is acted upon the vehicle in the vehicular inclined state shown in FIG. 19, a resultant force ($G_{hv}$) of a longitudinal acceleration -$G_h$ acted in parallel to the running road surface is also acted upon in the detection direction Q of the vertical G sensor 1 ($1_{FL}$, $1_{RL}$) so that the vertical acceleration (deceleration) signal is drifted toward the negative direction only by the resultant force ($G_{hv}$) of the longitudinal acceleration (or deceleration).

In the embodiment of the damping force characteristic controlling apparatus according to the present invention, the values of both bouncing components α f and α r are switched to zeroes to nullify the ratios of both bouncing components $G_{B-F}$ ($V_{bf}$) and $G_{B-R}$ ($V_{hv}$) on the longitudinal acceleration or deceleration from the control signal V defined in each equation of (7) to (10) thus the longitudinal acceleration (deceleration) component being canceled.

In addition, since the longitudinal acceleration $-G_h$ during the deceleration is acted upon all vertical G sensors 1 ($1_{FL}$, $1_{FR}$, $1_{RL}$, and $1_{RR}$) with the mutually same magnitude, the longitudinal acceleration (deceleration) component ($G_{hv}$) is canceled for the pitching component $G_p$ ($V_p$) and the rolling component $G_r$ ($V_r$). The pitching component is defined in the equation (3) and the rolling component is defined in the equation (4).

In the embodiment according to the present invention, the rolling gain γ is maintained at the normally set value and the value of the pitching gain β is switched to a larger value than the normal value so that the ratio of the pitching component $G_P$ ($V_P$) is increased by the values not using the bouncing components $G_{B-F}$ ($V_{bf}$) and $G_{B-R}$ ($V_{br}$).

Next, the signal drift is prevented during the deceleration so that the damping force characteristic control of each shock absorber SA under the same condition as the cruise speed run.

During the vehicular braking operation, the vehicular body diving phenomenon occurs such that the front end of the vehicle is dived (sunk) and the rear end of the vehicle is floating up so that the vehicle is inclined, The vehicle body speed is in the deceleration condition with the inclined state so that the resultant force of the deceleration is detected according to the sprung mass acceleration component on the downward direction (negative). The continuously inputted sprung mass acceleration component in the downward direction provides the cause of the signal drift.

The above matter occurs in such cases as the vehicular abrupt acceleration so as to generate the squat phenomenon as the accelerating run on a long ascending slope (in this case, the upward sprung mass acceleration component is detected), or so as to run in acceleration on the long ascending slope. Furthermore, it occurs when a DC component (extremely low frequency) is inputted to the signal of the vertical G sensor 1 ($1_{FL}$, $1_{FR}$, $1_{RL}$, and $1_{RR}$).

However, in the embodiment of the damping force characteristic controlling apparatus according to the present invention, a phase delay compensation equation is used as the velocity convertion to convert (transform) each of the sprung mass vertical accelerations G detected by the corresponding vertical G sensor into the sprung mass vertical velocity signal of each road wheel position so that the sprung mass vertical velocity signals are achieved whose gains at the low frequency side are reduced without worsening of the frequency band (0.5 Hz to 3 Hz) required for the damping force characteristic control.

Hence, during the braking operation, the influence of the reduction of the lower frequency side gain on the damping force characteristic control operation can be eliminated even if an extra low frequency component is added on the signal of the vertical G sensor 1 such as during the braking operation.

It is noted that, as shown in FIG. 2, the vehicular running state detector as the ABS sensor 2 may be replaced with a brake switch of a vehicular braking system, with a vehicle speed sensor, a road wheel rotation speed sensor, or accelerator pedal depression angle sensor.

What is claimed is:

1. An apparatus for a vehicle, comprising:
   a) a plurality of shock absorbers, each shock absorber being interposed between a vehicle body as a sprung mass and a corresponding one of front left and front right road wheels and rear left and rear right road wheels as an unsprung mass and being arranged so as to enable a variable modification of its damping force characteristic;
   b) sprung mass vertical acceleration sensors, each arranged on the vehicle body adjacent to the corresponding one of the front left, front right, rear left and rear right road wheels so as to detect a vertical acceleration of the sprung mass at the vehicle body corresponding to one of the shock absorber.;
   c) a control unit arranged for extracting vehicular bouncing components, a vehicular pitching component, and a vehicular rolling component from sprung mass acceleration signals derived by said sprung mass vertical acceleration sensors, for developing a control signal to be supplied to each shock absorber on the basis of at least the bouncing components, the pitching component, and the rolling component extracted from said sprung mass vertical acceleration signals, for variably adjusting said damping force characteristic of the corresponding one of the shock absorbers so as to provide a target damping force characteristic on the basis of a corresponding one of the developed control signals; and
   d) a vehicular running state detector arranged for detecting a variation rate of a vehicular running velocity, and wherein said control unit determines whether the vehicle body is inclined with respect to a running road surface on which the vehicle runs according to the variation rate of the vehicular running velocity and nullifies the bouncing components from among the components on the basis of which the control signals are developed when determining that the vehicle body is inclined.

2. An apparatus for a vehicle as claimed in claim 1, wherein at the same time when said control unit nullifies the bouncing components from among the components on the basis of which the control signals are developed when determining that the vehicle body is inclined, a ratio of the vehicular pitching component from among the components constituting each of the control signals is increased.

3. An apparatus for a vehicle as claimed in claim 1, wherein the vehicular running state detector comprises an ABS sensor arranged for detecting an operation of an anti-skid braking control system to enter a deceleration state of the vehicle.

4. An apparatus for a vehicle as claimed in claim 1, wherein said vehicular running state detector comprises a brake switch arranged on a vehicular braking system for detecting an operation state of an anti-skid braking control system mounted in the vehicle.

5. An apparatus for a vehicle as claimed in claim 1, wherein said vehicular running state detector comprises a vehicle speed sensor arranged for detecting a running speed of the vehicle and wherein said control unit determines whether either a vehicular acceleration or deceleration occurs or not according to the variation rate of a running speed signal derived from said vehicle speed sensor.

6. An apparatus for a vehicle as claimed in claim 1, wherein said vehicular running state detector comprises a road wheel rotation speed sensor arranged for detecting a rotation speed of one of the road wheels and wherein said control unit determines whether either a vehicular acceleration or deceleration occurs or not according to the variation rate of a running speed signal derived from said road wheel rotation speed sensor.

7. An apparatus for a vehicle as claimed in claim 1, wherein said vehicular running state detector comprises an acceleration depression angle detector arranged for detecting a depression angle of an accelerator pedal of the vehicle so as to determine whether a vehicular acceleration state occurs.

8. An apparatus for a vehicle as claimed in claim 2, wherein said control unit calculates a first acceleration-concerned bouncing component ($G_{B-F}$) on a front center position of the vehicle body between the front left and front right road wheels as follows:

$G_{B-F}=(G_{FL}+G_{FR})/2$, wherein $G_{FL}$ denotes the vertical sprung mass acceleration signal derived from the corresponding one of the sprung mass vertical acceleration sensors located at the part of the vehicle body corresponding to the front left road wheel and $G_{FR}$ denotes the sprung mass vertical acceleration signal derived from the corresponding one of the sprung mass vertical acceleration sensors located at the part of the vehicle body corresponding to the front right road wheel, calculates a second acceleration-concerned bouncing component ($G_{B-R}$) on a rear center position of the vehicle body between the rear left and rear right road wheels as follows:

$G_{B-R}=(G_{RL}+G_{RR})/2$, wherein $G_{RL}$ denotes the vertical sprung mass acceleration signal derived from the corresponding one of the sprung mass vertical acceleration sensors located at the part of the vehicle body corresponding to the rear left road wheel and $G_{RR}$ denotes the sprung mass vertical acceleration signal derived from the corresponding one of the sprung mass vertical acceleration sensors located at the part of the vehicle body corresponding to the rear right road wheel, calculates the vehicular pitching component as follows: $G_P=((G_{FL}+G_{FR})-(G_{RL}+G_{RR}))/4$, and calculates the vehicular rolling component as follows: $Gr=((G_{FR}+G_{RR})-(G_{FR}+G_{RR}))/4$.

9. An apparatus for a vehicle as claimed in claim 8, wherein said control unit converts the first and second acceleration-concerned bouncing components, the vehicular pitching component and the vehicular rolling component into velocity-concerned components $V_{B-f}$ and $V_{B-R}$ using the following phase delay compensation transfer function: $G(s)=(0.001s+1)/(10s+1)\cdot\gamma$, wherein s denotes a complex variable and $\gamma$ denotes a gain to match a gain characteristic to a signal derived by integrating each component (1/s).

10. An apparatus for a vehicle as claimed in claim 9, wherein said control unit derives the control signals V ($V_{FR}$, $V_{FL}$, $V_{RR}$, and $V_{RL}$) for the respective shock absorbers as follows:

Front right road wheel (FR):

$V_{FR}=\alpha_f V_{bf}+\beta\cdot V_P+r\cdot V_R$

Front left road wheel (FL):

$V_{FL}=\alpha_f V_{bf}+\beta\cdot V_P-r\cdot V_R$

Rear right road wheel (RR):

$V_{RR}=\alpha_r\cdot V_{br}-\beta\cdot V_P+r\cdot V_R,$

Rear left road wheel (RL):

$V_{RL}=\alpha_r\cdot V_{br}-\beta\cdot V_P-r\cdot V_R,$ wherein $\alpha_f$ and $\alpha_r$ denote bouncing gains set for the front and rear road wheel bouncing components ($V_{bf}$ and $V_{br}$), $\beta$ denotes a pitching gain set for the pitching component ($V_p$), and r denotes a rolling gain set for the rolling component ($V_R$).

11. An apparatus for a vehicle as claimed in claim 10, wherein said control unit determines that a vehicular deceleration as to incline the vehicle occurs, said control unit nullifies the front and rear road wheel side bouncing gains $\alpha_f$ and $\alpha_r$ and, at the same time, increases the pitching gain : by a value larger than a normally used value.

12. An apparatus for a vehicle as claimed in claim 11, wherein said velocity-concerned bouncing components $V_{B-F}$ and $V_{B-R}$ the pitching component $V_P$, and the rolling component $V_R$ are passed through respective band pass filters, two of the band pass filters having a second-order high pass filter (HPF) with a cut-off frequency of 0.7 Hz and a second-order low pass filter (LPF) with a cut-off frequency of 0.8 Hz respectively and the other two band pass filters having another high pass filter with a cut-off frequency of 0.5 Hz and having another low pass filter with a cut-off frequency of 0.5 Hz respectively.

13. An apparatus for a vehicle as claimed in claim 11, wherein each of said shock absorbers has three modes of soft region (SS) in which both extension and compression stroke phases are set to soft damping force characteristics; extension stroke phase hard region (HS) to which the extension stroke phase is set to a hard damping force characteristic with the compression stroke phase being fixed to the soft damping force characteristic; compression stroke phase hard region (SH) in which the compression stroke phase is set to the hard damping force characteristic with the compression stroke phase being fixed to the soft damping force characteristic and wherein said control unit controls the damping force characteristic of each of said shock absorbers (SA) so as to provide the soft region (SS) when a direction discriminating sign of the corresponding one of the control signals ($V_{FR}$, $V_{FL}$, $V_{RR}$, and $V_{RL}$) indicates a value placed in the vicinity to zero, so as to provide the extension stroke phase region (HS) when the direction discriminating sign of the corresponding one of the control signals ($V_{FR}$, $V_{FL}$, $V_{RR}$, $V_{RL}$) indicates positive, and said control unit controls the damping force characteristic of each of the shock absorbers (SA) so as to provide the compression stroke phase hard region (SH) when the direction discriminating sign of the corresponding one of the control signals ($V_{FR}$, $V_{FL}$, $V_{RR}$, and $V_{RL}$) indicates negative.

14. A method for controlling a damping force characteristic for each vehicular shock absorber, each vehicular shock absorber being interposed between a vehicle body as a sprung mass and a corresponding one of front left and front right road wheels as an unsprung mass and being arranged so as to enable the damping force characteristic to be modified, comprising the steps of:

a) detecting a sprung mass vertical acceleration on a part of the vehicle body adjacent to the corresponding one of the front left and front right road wheels;

b) determining vehicular bouncing components, a vehicular pitching component, a vehicular rolling component, and a vehicular rolling component according to the detected sprung mass vertical accelerations at the step a);

c) developing control signals for the respective shock absorbers, each of said control signals being developed on the basis of said bouncing components, said pitching component, and said rolling component determined at the step b);

d) controlling the damping force characteristic for the corresponding one of the shock absorbers on the basis of the corresponding one of said developed control signals;

e) detecting whether the vehicle body is inclined with respect to a running road surface on which the vehicle is running;

f) nullifying the bouncing components from hi among the components constituting the respective control signals when detecting that the vehicle body is inclined with respect to the running road surface.

\* \* \* \* \*